United States Patent
Gracia et al.

(10) Patent No.: US 12,460,134 B2
(45) Date of Patent: Nov. 4, 2025

(54) POLYMERIZABLE LIQUID CRYSTAL INK FORMULATIONS

(71) Applicant: MERCK PATENT GMBH, Darmstadt (DE)

(72) Inventors: Eduardo Beltran Gracia, Southampton (GB); Stephen Mulcahy, Southampton (GB); Daniel Walker, Eastleigh (GB)

(73) Assignee: MERCK PATENT GMBH, Darmstadt (DE)

( * ) Notice: Subject to any disclaimer, the term of this patent is extended or adjusted under 35 U.S.C. 154(b) by 723 days.

(21) Appl. No.: 17/312,857

(22) PCT Filed: Dec. 9, 2019

(86) PCT No.: PCT/EP2019/084124
§ 371 (c)(1),
(2) Date: Jun. 10, 2021

(87) PCT Pub. No.: WO2020/120353
PCT Pub. Date: Jun. 18, 2020

(65) Prior Publication Data
US 2022/0056340 A1    Feb. 24, 2022

(30) Foreign Application Priority Data

Dec. 12, 2018 (EP) .................................... 18211998

(51) Int. Cl.
| | | |
|---|---|---|
| *C09D 11/033* | (2014.01) | |
| *C09D 11/107* | (2014.01) | |
| *C09D 11/30* | (2014.01) | |
| *C09D 11/36* | (2014.01) | |
| *C09D 11/38* | (2014.01) | |
| *C09K 19/38* | (2006.01) | |
| *C09K 19/58* | (2006.01) | |
| *G02B 5/20* | (2006.01) | |
| *C09K 19/04* | (2006.01) | |
| *C09K 19/52* | (2006.01) | |

(52) U.S. Cl.
CPC ........ *C09K 19/3852* (2013.01); *C09D 11/033* (2013.01); *C09D 11/107* (2013.01); *C09D 11/30* (2013.01); *C09D 11/36* (2013.01); *C09D 11/38* (2013.01); *C09K 19/586* (2013.01); *G02B 5/201* (2013.01); *C09K 2019/0448* (2013.01); *C09K 2019/525* (2013.01); *C09K 2219/00* (2013.01)

(58) Field of Classification Search
CPC ....... C09D 11/03; C09D 11/107; C09D 11/36; C09D 11/30; C09K 19/586; C09K 19/3852; C09K 2019/0448; C09K 2019/525; C09K 2219/00
USPC .................................................... 428/1.1, 1.3
See application file for complete search history.

(56) References Cited

U.S. PATENT DOCUMENTS

| | | |
|---|---|---|
| 8,687,259 B2 | 4/2014 | Adlem et al. |
| 10,106,742 B2 | 10/2018 | Yoon et al. |
| 2010/0193736 A1* | 8/2010 | Inagaki ............. C09K 19/3861 560/81 |
| 2011/0117295 A1 | 5/2011 | Kimura et al. |
| 2013/0114136 A1* | 5/2013 | Saito .................... G02B 5/3083 349/194 |
| 2015/0344781 A1 | 12/2015 | Chen et al. |
| 2016/0245968 A1 | 8/2016 | Ichihara et al. |
| 2017/0029700 A1 | 2/2017 | Taniguchi et al. |
| 2019/0196245 A1 | 6/2019 | Ichihara et al. |
| 2020/0291299 A1 | 9/2020 | Mulcahy et al. |

FOREIGN PATENT DOCUMENTS

| | | |
|---|---|---|
| EP | 2309291 A1 | 4/2011 |
| EP | 2937402 A1 | 10/2015 |
| JP | 2009128588 A | 6/2009 |
| JP | 2011068833 A | 4/2011 |
| JP | 2013509458 A | 3/2013 |
| JP | 2016153861 A | 8/2016 |
| JP | 2016531989 A | 10/2016 |
| TW | 201610110 A | 3/2016 |
| TW | 201739902 A | 11/2017 |
| WO | 2010007758 A1 | 1/2010 |
| WO | 2011050896 A1 | 5/2011 |
| WO | 2015036072 A1 | 3/2015 |
| WO | 2017148567 A1 | 9/2017 |
| WO | 2018043678 A1 | 3/2018 |

OTHER PUBLICATIONS

International Search Report for PCT/EP2019/084124 dated Mar. 13, 2020.
English Abstract Provided for JP2011068833, Publication Date: Apr. 7, 2011.

* cited by examiner

*Primary Examiner* — Ruiyun Zhang
(74) *Attorney, Agent, or Firm* — Millen, White, Zelano & Branigan, P.C.; Brion P. Heaney

(57) ABSTRACT

The present invention relates to polymerizable liquid crystalline formulations and especially to an ink formulation for inkjet printing comprising 10 to 50% w/w of one or more polymerizable liquid crystalline compounds and 50 to 90% w/w of one or more organic solvents selected from the group of aliphatic ketones, cyclic ketones, alkyl ethers of ethylene glycol or propylene glycol, alkyl esters of menthyl or aromatic solvents.

13 Claims, No Drawings

POLYMERIZABLE LIQUID CRYSTAL INK FORMULATIONS

TECHNICAL FIELD

The present invention relates to polymerizable liquid crystalline formulations and especially to an ink formulation for inkjet printing comprising 10 to 50% w/w of one or more polymerizable liquid crystalline compounds and 50 to 90% w/w of one or more organic solvents selected from the group of aliphatic ketones, cyclic ketones, alkyl ethers of ethylene glycol or propylene glycol, alkyl esters of menthyl or aromatic solvents.

BACKGROUND AND PRIOR ART

Flat liquid crystal displays exhibit good image quality, low cost and good processability over a large area size thanks to the well-stablish supply chain of all its components. However, brightness and colour gamut are in general inferior compared to light emitting diodes (LEDs) and organic light-emitting diodes displays (OLED). A larger layout comprising polarizers, absorptive colour filters, and optical films present in the LCD panel compared to the OLED panel is the main reason for the lower transmission and colour purity of LCD displays which ends-up in less power efficient devices. For reference, only about 30% of the light emitted from the backlight unit is experienced by the user because the light is blocked or absorbed by the liquid crystal panel.

JP 4752581 B2 suggests a manufacturing method for an improved colour filter, which possesses a process to form barriers on a substrate; a process to form multiple coloured pixel patterns having a certain retardation between the said barriers by a photo-lithography method; a process to form an alignment film processed by an alignment treatment on the said coloured pixel pattern; and a process to form a liquid crystal phase shift layer on the said alignment film by an ink jet method, by corresponding to each retardation of the said multiple coloured pixel patterns, wherein the said liquid crystal phase shift layer comprises the multiple liquid crystal phase shift regions corresponding to the multiple the retardation which corrects the retardation of the said multiple coloured pixel patterns; and the total for the retardation of the said multiple coloured pixel patterns and the retardation in the corresponding multiple liquid crystal phase shift regions is characteristically and essentially same for each pixel.

However, the suggested process requires further processing steps in terms of commonly known methods of mass production, such as a process to form barriers on a substrate by a photo-lithography method.

Other attempts to improve the light efficiency have been reported as colour filter free LCD panels. Such displays have backlight units comprising a plurality of white, red, green, and blue light emitting diodes arranged on the substrate, for example described in U.S. Pat. No. 8,928,841 B2.

Backlight units containing phosphor-converted white LEDs which are emitting blue light which is converted into yellow radiation by the phosphor material for providing the final white light are described e.g. in KR 10-0946015 B1.

However, the broad bandwidth for the converted yellow light generates important limitations which prevent high brightness and colour gamut due to the absorption of light by the colour filters. Thereby, narrow bandwidth RGB emitters are a preferred option for increasing the colour gamut by avoiding the parallax effect and increasing the overall brightness of LCD displays.

In this regard, quantum materials (QMs) fit perfectly for solving the above-mentioned disadvantage because of the following outstanding features:
- their central emission wavelength can be tuned by controlling the size of the nanoparticles,
- their FWHM is around 20-30 nm, which is mainly determined by the size
- their photoluminescence efficiency is high, and
- the resulting device configuration is simple.

On the one hand, these properties make them good candidates to replace the phosphor materials in the backlight unit, as it is, for example, described in Adv. Mater. 2010, vol. 22, pp. 3076-3080, on the other hand these properties make them also good candidates for replacing the conventional absorptive colour filters, as it is described, for example, in CN 102944943 B. Both approaches lead to LCD displays with high transmission and colour gamut, leading to splendid image quality. if the colour of light is provided as needed for the conversion.

Polymerizable liquid crystal based optical films or such as optical retarders, brightness enhancement films or reflective optical films are described, for example, in EP 0 940 707 B1, EP 0 888 565 B1 and GB 2 329 393 B1. Their high birefringence, favourable alignment control and well-established handling in mass production make them excellent materials for improving the performance of displays.

A commonly used method of mass production for these films comprises the steps of
- providing a continuous layer of a polymerizable LC material onto a substrate, for example by ink-jet printing,
- polymerizing the polymerizable components of the polymerizable LC material by photopolymerization, and
- optionally removing the polymerised LC material from the substrate and/or optionally providing it onto another substrate.

Because of the above-described procedure, polymerizable liquid crystal or reactive mesogen (RM) based optical films form a continuous film provided as a single layer in the display layout having a distinct thickness over the whole layer.

The optical retardation ($\delta(\lambda)$) of a such polymer film as a function of the wavelength of the incident beam ($\lambda$) is given by the following equation:

$$\delta(\lambda) = (2\pi \Delta \eta \cdot d)/\lambda$$

wherein ($\Delta n$) is the birefringence of the film, (d) is the thickness of the film and $\lambda$ is the wavelength of the incident beam.

Accordingly, the optical retardation of the given polymerised liquid crystal film is constant in the x-y plane. However, ideally for every subpixel (RGB) a different optical performance in the x-y plane of the polymer film is required for each colour. Also, cholesteric optical films are often utilized to enhance the brightness of the device, however, also here different optical reflection of the polymer film is required for each colour.

Inkjet printing is a manufacturing technique for depositing inks or materials on to a variety of substrates with micron scale precision, such as subpixel size. It can be used to create complex patterns that could otherwise only be produced through more complex multistep processes using photomasks, such as patterned retarders. Further, it offers potential to digitalise the manufacturing process, which is currently limited to processes such as roll-to-roll large area substrates. In addition, inkjet printing could be used to coat specific materials on specific locations of a given substrate or enable pixel-to-pixel printing.

One general challenge in inkjet printing is controlling the thickness profile of drying depositions as described for example in J. Sun, B. Bao, M. He, H. Zhou and Y. Song, ACS Appl. Mater. Interfaces, 2015, 7, 28086-28099 or P. Calvert, Chem. Mater., 2001, 13, 3299-3305.

A common profile observed when inkjet-printing solids from solvent is the coffee-ring effect, as further described in D. Mampallil and H. B. Eral, Adv. Colloid Interface Sci., 2018, 252, 38-54; W. Han and Z. Lin, Angew. Chemie—Int. Ed., 2012, 51, 1534-1546 or R. D. Deegan, O. Bakajin, T. F. Dupont, G. Huber, S. R. Nagel and T. A. Witten, Nature, 1997, 389, 827-829.

The solvent then becomes depleted at the edges, and solvent at the centre of the drying droplet is driven to the edges. This solvent takes with it the solute, and upon full evaporation leaves a profile with material accumulated at the edges.

For non-polymerizable liquid crystal formulations, such as printing Inks for OLED applications, methods are described for solving the problem of the coffee ring effect, such as using mixed solvent systems and surfactants, as described for example in T. Still, P. J. Yunker and A. G. Yodh, Langmuir, 2012, 28, 4984-4988 or C. Jiang, Z. Zhong, B. Liu, Z. He, J. Zou, L. Wang, J. Wang, J. Peng and Y. Cao, ACS Appl. Mater. Interfaces, 2016, 8, 26162-26168. Further to these solutions, reducing the evaporation rate to prevent this unwanted transport of solute is suggested in D. Soltman and V. Subramanian, Langmuir, 2008, 24, 2224-2231.

However, in view of polymerizable liquid crystal formulations, smooth surface profile and high alignment quality of the liquid crystal molecules are required to produce good optical performance from ink-jet printed optical films. Further, it has been found out by the inventors that commonly used solvent systems for non-polymerizable liquid crystal formulations used in inks and based on high boiling point solvents (such as gamma-Butyrolactone, cyclohexyl benzene, butyl benzoate, methyl benzoate, 1-methyl naphthalene, etc) are not suitable to use with polymerizable liquid crystal mixtures due the very long times required for its evaporation. These long evaporation times usually result in poor alignment quality of ink-jet printed polymer films obtained from polymerizable liquid crystal formulations.

In addition, common solvents used in polymerizable liquid crystal mixtures (such as cyclohexanone, toluene, cyclopentanone, PGMEA, MIBK, etc) are not suitable to be used in inkjet printing techniques due to the very fast evaporation of the solvent which prevents the use of inkjet printing techniques. Typically, low boiling point solvents as described above are commonly not suitable for inkjet printing as the volume of each drop is much smaller than standard coating volumes. This leads to evaporation and subsequent crystallisation on the print head, blocking further printing.

Bearing these problems in mind, there is a great demand for polymerizable liquid crystal mixtures or ink formulations based on high boiling point solvent systems that comprise beside one or more polymerizable liquid crystal compounds, one or more solvents for ink-jet printing applications that preferably exhibiting slow evaporation rates and high annealing temperatures. Furthermore, the polymer films obtained from such formulations by inkjet printing should exhibit a good alignment quality after polymerisation, even when printed in small areas, such as a typically pixel or subpixel size.

Surprisingly the inventors have found out that certain families of solvents and solvent combinations in combination with polymerizable liquid crystal materials show very good jetting properties while still achieving high resolution and flat printing profiles at the same time.

SUMMARY OF THE INVENTION

Thus, the present invention relates to an ink formulation for inkjet printing comprising 10 to 50% w/w of one or more polymerizable liquid crystalline compounds and 50 to 90% w/w of one or more organic solvents selected from the group of aliphatic ketones, cyclic ketones, alkyl ethers of ethylene glycol or propylene glycol, alkyl esters of menthyl or aromatic solvents.

Further the present invention relates to a method of production of an ink formulation by mixing at least 10 to 50% w/w of one or polymerizable liquid crystalline compounds with 50 to 90% w/w of one or more solvents selected from the group of aliphatic ketones, cyclic ketones, alkyl ethers of ethylene glycol or propylene glycol, or aromatic solvents.

Further the present invention relates to the use of ink formulations as described above and below in ink jet printers.

Further the present invention relates to a polymer film obtainable or obtained from inkjet printing an ink formulation as described above and below on a substrate and curing of the ink formulation.

Further the present invention relates to a method of production of a polymer film comprising the steps of inkjet printing an ink formulation as described above and below on a substrate and curing of the ink formulation.

Further the invention relates to the use of a polymer film as described above and below as an optical film or in an optical component.

Further the present invention relates to an optical component, comprising one or more polymer films obtainable or obtained from an ink formulation as described above and below.

Another aspect of the present invention is the use of one or more optical components as described above and below in an optical device.

Another aspect of the present invention is an optical device comprising one or more optical components, which comprise one or more polymer films obtainable or obtained from one or more ink formulation as described above and below.

DETAILED DESCRIPTION

The present invention relates to an polymerizable liquid crystalline ink formulation for inkjet printing comprising 10 to 50% w/w of one or more polymerizable liquid crystalline compounds and 50 to 90% w/w of one or more organic solvents selected from the group of aliphatic ketones, cyclic ketones, alkyl ethers of ethylene glycol or propylene glycol, alkyl esters of menthyl or aromatic solvents.

Preferably, one or more polymerizable liquid crystalline compounds utilized in the ink formulation in accordance with the present invention are selected from di- or multireactive compounds of formula DRM $$P^1\text{—}Sp^1\text{-MG-}Sp^2\text{—}P^2 \qquad \text{DRM}$$

wherein
P¹ and P² independently of each other denote a polymerizable group,
Sp¹ and Sp² independently of each other are a spacer group or a single bond, and
MG is a rod-shaped mesogenic group, which is preferably selected of formula MG -(A¹-Z¹)$_n$-A²-    MG wherein
A¹ and A² denote, in case of multiple occurrence independently of one another, an aromatic or alicyclic group, which optionally contains one or more heteroatoms selected from N, O and S, and is optionally mono- or polysubstituted by L¹,
L¹ is P—Sp—, F, Cl, Br, I, —CN, —NO₂, —NCO, —NCS, —OCN, —SCN, —C(=O)NR⁰⁰R⁰⁰⁰, —C(=O)OR⁰⁰, —C(=O)R⁰⁰, —NR⁰⁰R⁰⁰⁰, —OH, —SF₅, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl,
R⁰⁰ and R⁰⁰⁰ independently of each other denote H or alkyl with 1 to 12 C-atoms,
Z¹ denotes, in case of multiple occurrence independently of one another, —O—, —S—, —CO—, —COO—, —OCO—, —S—CO—, —CO—S—, —O—COO—, —CO—NR⁰⁰—, —NR⁰⁰—CO—, —NR⁰⁰—CO—NR⁰⁰⁰, —NR⁰⁰—CO—O—, —O—CO—NR⁰⁰—, —OCH₂—, —CH₂O—, —SCH₂—, —CH₂S—, —CF₂O—, —OCF₂—, —CF₂S—, —SCF₂—, —CH₂CH₂—, —(CH₂)$_{n1}$—, —CF₂CH₂—, —CH₂CF₂—, —CF₂CF₂—, —CH=N—, —N=CH—, —N=N—, —CH=CR⁰⁰—, —CY¹=CY²—, —C≡C—, —CH=CH—COO—, —OCO—CH=CH— or a single bond,
Y¹ and Y² independently of each other denote H, F, Cl or CN,
n is 1, 2, 3 or 4, preferably 1 or 2, most preferably 2,
n1 is an integer from 1 to 10, preferably 1, 2, 3 or 4.

"Polymerizable groups" (P) are preferably selected from groups containing a C=C double bond or C≡C triple bond, and groups which are suitable for polymerization with ring opening, such as, for example, oxetane or epoxide groups.

Preferably, polymerizable groups (P) are selected from the group consisting of CH₂=CW¹—COO—, CH₂=CW¹—CO—,

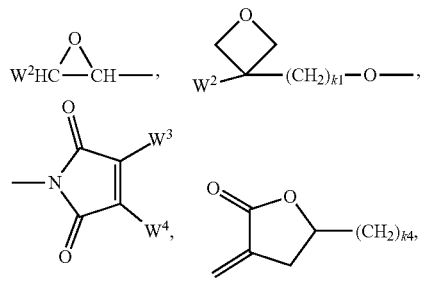

CH₂=CW²—(O)$_{k3}$—,    CW¹=CH—CO—(O)$_{k3}$—,
CW¹=CH—CO—NH—,    CH₂=CW¹—CO—NH—,
CH₃—CH=CH—O—,    (CH₂=CH)₂CH—OCO—,
(CH₂=CH—CH₂)₂CH—OCO—,    (CH₂=CH)₂CH—O—,
(CH₂=CH—CH₂)₂N—,    (CH₂=CH—CH₂)₂N—CO—,
CH₂=CW¹—CO—NH—,    CH₂=CH—(COO)$_{k1}$-Phe-(O)$_{k2}$—,    CH₂=CH—(CO)$_{k1}$-Phe-(O)$_{k2}$—,    Phe-CH=CH—, in which
W¹ denotes H, F, Cl, CN, CF₃, phenyl or alkyl having 1 to 5 C atoms, in particular H, F, Cl or CH₃,
W² denotes H or alkyl having 1 to 5 C atoms, in particular H, methyl, ethyl or n-propyl,
W³ and W⁴ each, independently of one another, denote H, Cl or alkyl having 1 to 5 C atoms, Phe denotes 1,4-phenylene, which is optionally substituted by one or more radicals L as being defined above but being different from P—Sp, preferably preferred substituents L are F, Cl, CN, NO₂, CH₃, C₂H₅, OCH₃, OC₂H₅, COCH₃, COC₂H₅, COOCH₃, COOC₂H₅, CF₃, OCF₃, OCHF₂, OC₂F₅, furthermore phenyl, and
k₁, k₂ and k₃ each, independently of one another, denote 0 or 1, k₃ preferably denotes 1, and k₄ is an integer from 1 to 10.

Particularly preferred polymerizable groups P are CH₂=CH—COO—, CH₂=C(CH₃)—COO—, CH₂=CF—COO—, CH₂=CH—, CH₂=CH—O—, (CH₂=CH)₂CH—OCO—, (CH₂=CH)₂CH—O—,

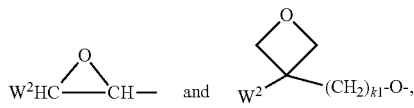

in which W² denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerizable compounds and sub-formulae thereof contain instead of one or more radicals P—Sp—, one or more branched radicals containing two or more polymerizable groups P (multireactive polymerizable radicals).

Suitable radicals of this type, and polymerizable compounds containing them, are described, for example, in U.S. Pat. No. 7,060,200 B1 or US 2006/0172090 A¹.

Particular preference is given to multireactive polymerizable radicals selected from the following formulae:

| | |
|---|---|
| -X-alkyl—CHP$^x$—CH₂—CH₂P$^y$ | I*a |
| -X-alkyl—C(CH₂P$^x$)(CH₂P$^y$)—CH₂P$^z$ | I*b |
| -X-alkyl—CHP$^x$CHP$^y$—CH₂P$^z$ | I*c |
| -X-alkyl—C(CH₂P$^x$)(CH₂P$^y$)—C$_{aa}$H$_{2aa+1}$ | I*d |
| -X-alkyl—CHP$^x$—CH₂P$^y$ | I*e |
| -X-alkyl—CHP$^x$P$^y$ | I*f |
| -X-alkyl-CP$^x$P$^y$—C$_{aa}$H$_{2aa+1}$ | I*g |
| -X-alkyl—C(CH₂P$^x$)(CH₂P$^y$)—CH₂OCH₂—C(CH₂P$^x$)(CH₂Py)CH₂P$^z$ | I*h |
| -X-alkyl—CH((CH₂)$_{aa}$P$^x$)((CH₂)$_{bb}$P$^y$) | I*i |
| -X-alkyl—CHP$^x$CHP$^y$—C$_{aa}$H$_{2aa+1}$ | I*k | in which
alkyl denotes a single bond or straight-chain or branched alkylene having 1 to 12 C atoms, in which one or more non-adjacent CH₂ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^x$ has one the above-mentioned meaning, aa and bb each, independently of one another, denote 0, 1, 2, 3, 4, 5 or 6, X has one of the meanings indicated for X', and $P^v$ to $P^z$ each, independently of one another, have one of the meanings indicated above for P.

Preferred spacer groups Sp are selected from the formula Sp'—X', so that the radical "P—Sp—" conforms to the formula "P—Sp'—X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^{xx}$—, —$SiR^{xx}R^{yy}$—, —CO—, —COO—, —OCO—, —OCO—O—, —S—CO—, —CO—S—, —$NR^{xx}$—CO—O—, —O—CO—$NR^{0xx}$—, —$NR^{xx}$—CO—$NR^{yy}$—, —CH=CH— or —C≡C— in such a way that O and/or S atoms are not linked directly to one another, X denotes —O—, —S—, —CO—, —COO—, —OCO—, —O—COO—, —CO—$NR^{xx}$—, —$NR^{xx}$—CO—, —$NR^{xx}$—CO—$NR^{yy}$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^{xx}$—, —$CY^{xx}$=$CY^{xx}$—, —C≡C—, —CH=CH—COO—, —OCO—CH=CH— or a single bond, $R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

X' is preferably —O—, —S— —CO—, —COO—, —OCO—, —O—COO—, —CO—$NR^{xx}$—, —$NR^{xx}$—CO—, —$NR^{xx}$—CO—$NR^{yy}$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^{xx}R^{yy}$—O$)_{p1}$—, in which p1 is an integer from 1 to 12, q1 is an integer from 1 to 3, and $R^{xx}$ and $R^{yy}$ have the above-mentioned meanings.

Particularly preferred groups —X'—Sp'— are —$(CH_2)_{p1}$—, —O—$(CH_2)_{p1}$—, —OCO—$(CH_2)_{p1}$—, —OCOO—$(CH_2)_{p1}$—, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Preferred groups $A^1$ and $A^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent $CH_2$ groups are optionally replaced by O and/or S, wherein these groups are unsubstituted or substituted by 1, 2, 3 or 4 groups L as defined above.

Particular preferred groups $Z^1$ are in each occurrence independently from another preferably selected from —COO—, —OCO—, —$CH_2CH_2$—, —$CF_2O$—, —$OCF_2$—, —C≡C—, —CH=CH—, —OCO—CH=CH—, —CH=CH—COO—, or a single bond.

Very preferred directive mesogenic compounds of formula DRM are selected from the following formulae:

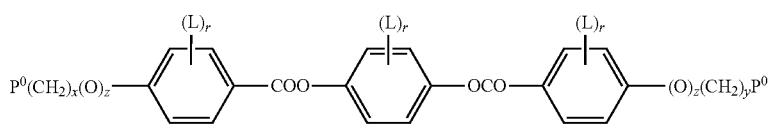

DRMa1

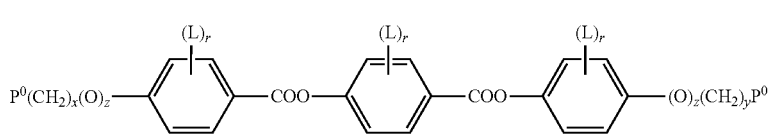

DRMa2

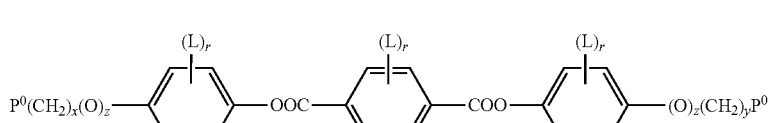

DRMa3

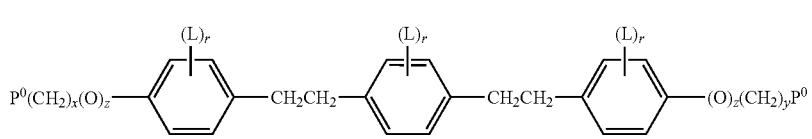

DRMa4

-continued

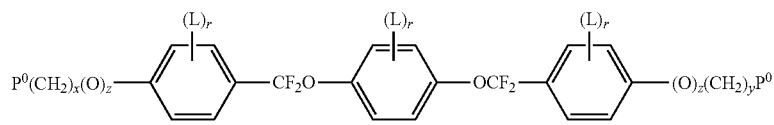
DRMa5

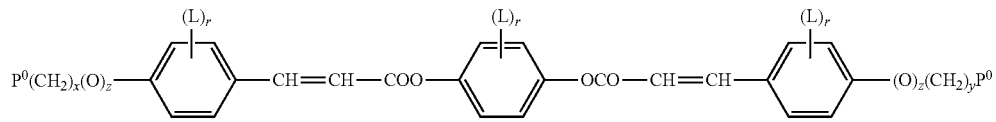
DRMa6

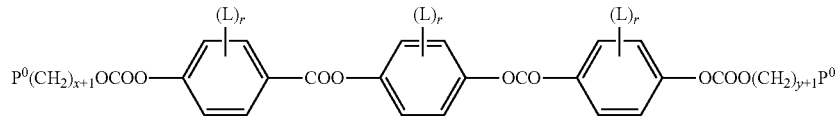
DRMa7

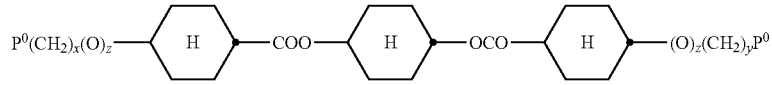
DRMb

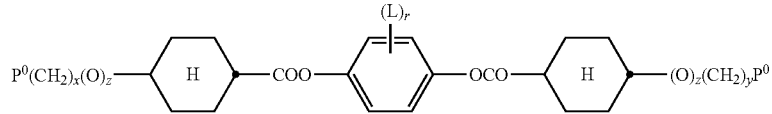
DRMc

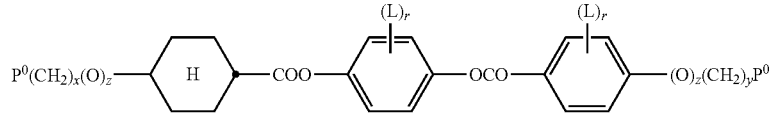
DRMd

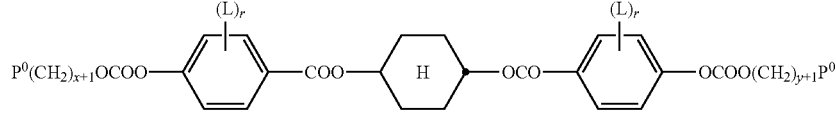
DRMe wherein
$P^0$ is, in case of multiple occurrence independently of one another, a polymerizable group, preferably an acryl, methacryl, oxetane, epoxy, vinyl, heptadiene, vinyloxy, propenyl ether or styrene group, L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, x and y are independently of each other 0 or identical or different integers from 1 to 12, Z is each and independently, 0 or 1, with z being 0 if the adjacent x or y is 0.

Especially preferred are compounds of formula DRMa1, DRMa2 and DRMa3, in particular those of formula DRMa1.

In another preferred, one or more polymerizable compounds utilized in the ink formulation in accordance with the present invention are selected from monoreactive liquid crystalline compounds formula MRM, $$P^1\text{—}Sp^1\text{-MG-R} \quad \text{MRM}$$

wherein $P^1$, $Sp^1$ and MG have the meanings given in formula DRM,

R F, Cl, Br, I, —CN, —NO$_2$, —NCO, —NCS, —OCN, —SCN, —C(=O)NR$^x$R$^y$, —C(=O)X, —C(=O)OR$^x$, —C(=O)R$^y$, —NR$^x$R$^y$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and $R^x$ and $R^y$ are independently of each other H or alkyl with 1 to 12 C-atoms.

Preferred monoreactive mesogenic compounds of formula MRM are selected from the following formulae.

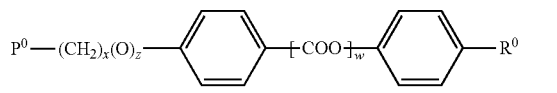
MRM1

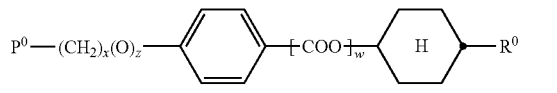
MRM2

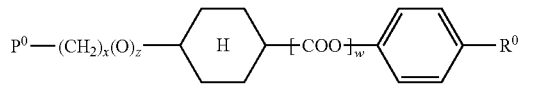
MRM3

MRM4
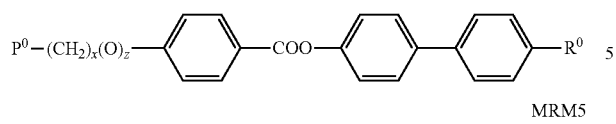
MRM5
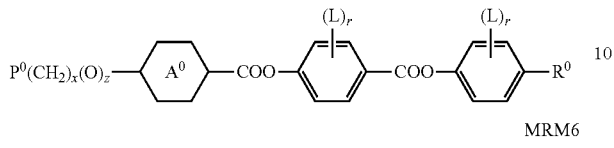
MRM6
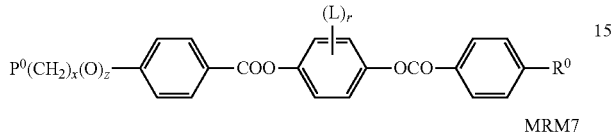
MRM7
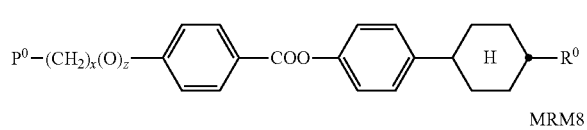
MRM8
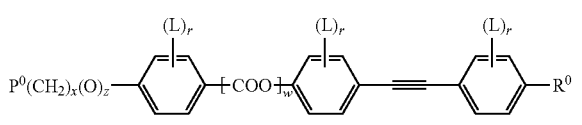
MRM9
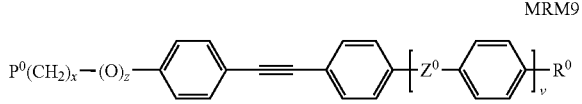
MRM10
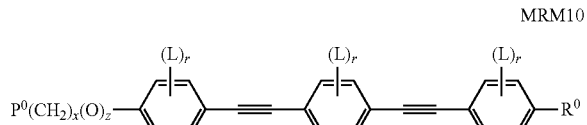
MRM11
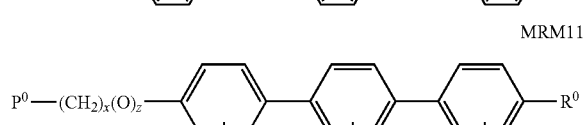
MRM12
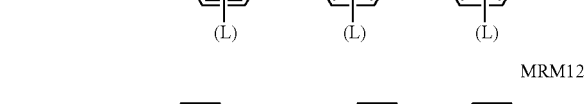
MRM13
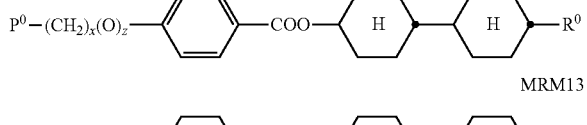
MRM14
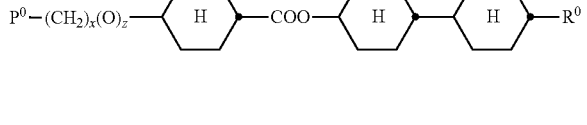
MRM15
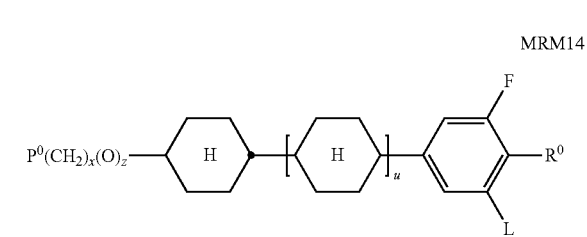
MRM16
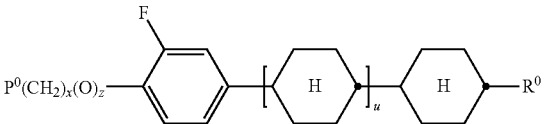
MRM17
MRM18
MRM19
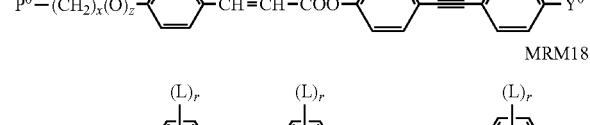
MRM20
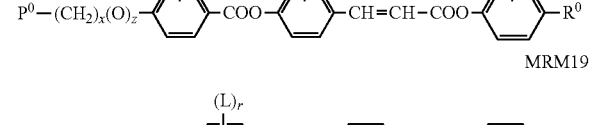
MRM21
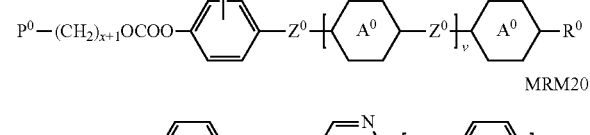
MRM22
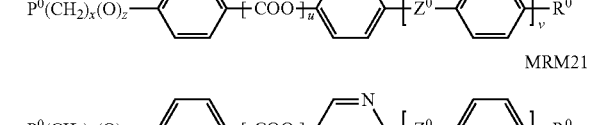
MRM23
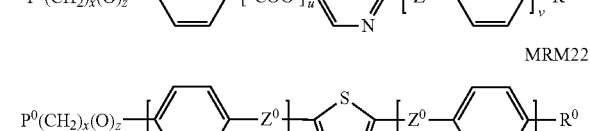
MRM24
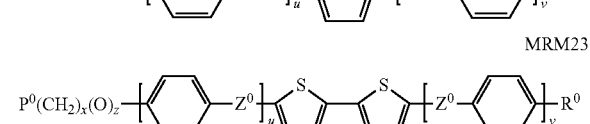
MRM25
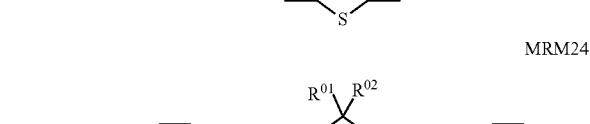
MRM26
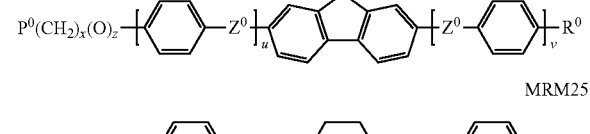

-continued

MRM27

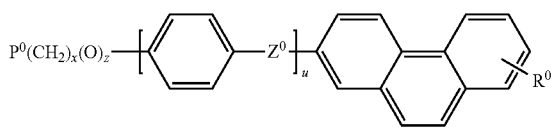

wherein P⁰, L, r, x, y and z are as defined in formula DRMa-1 to formula DRMe,

R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes Y⁰, Y⁰ is F, Cl, CN, NO$_2$, OCH$_3$, OCN, SCN, SF$_5$, or mono-oligo- or polyfluorinated alkyl or alkoxy with 1 to 4 C atoms, Z⁰ is —COO—, —OCO—, —CH$_2$CH$_2$—, —CF$_2$O—, —OCF$_2$—, —CH═CH—, —OCO—CH═CH—, —CH═CH—COO—, or a single bond, A⁰ is, in case of multiple occurrence independently of one another, 1,4-phenylene that is unsubstituted or substituted with 1, 2, 3 or 4 groups L, or trans-1,4-cyclohexylene, u and v are independently of each other 0, 1 or 2, W is 0 or 1, and wherein the benzene and naphthalene rings can additionally be substituted with one or more identical or different groups L.

Further preferred are compounds of formula MRM1, MRM2, MRM3, MRM4, MRM5, MRM6, MRM7, MRM9 and MRM10, especially those of formula MRM1, MRM4, MRM6, and MRM7, and in particular those of formulae MRM1 and MRM7.

The compounds of the formulae DRM, MRM, and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The compounds of the formulae DRM, MRM, and sub-formulae thereof can preferably be utilized either taken alone or in combination with each other.

Preferably, the utilized polymerizable liquid crystalline compounds encompass compounds selected from one or more compounds of formula DRM, more preferably from one or more compounds of formula DRM and one or more compounds of formula MRM The proportion of compounds of the formulae DRM, MRM, and sub-formulae thereof in terms of the utilized polymerizable liquid crystalline compounds as a whole, is preferably in the range from 30 to 99.9% by weight, more preferably in the range from 40 to 99.9% by weight and even more preferably in the range from 50 to 99.9% by weight.

In a preferred embodiment, the proportion of directive polymerizable mesogenic compounds in terms of the utilized polymerizable liquid crystalline compounds as a whole, are preferably in the range from 5 to 99% by weight, more preferably in the range from 10 to 97% by weight and even more preferably in the range from 15 to 95% by weight.

In another preferred embodiment, the proportion of monoreactive polymerizable mesogenic compounds in terms of the utilized polymerizable liquid crystalline compounds as a whole are, if present, preferably in the range from 5 to 80% by weight, more preferably in the range from 10 to 75% by weight and even more preferably in the range from 15 to 70% by weight.

In another preferred embodiment, the proportion of multireactive polymerizable mesogenic compounds in a polymerizable liquid-crystalline material according to the present invention as a whole are, if present, preferably in the range from 1 to 30% by weight, more preferably in the range from 2 to 20% by weight and even more preferably in the range from 3 to 10% by weight.

In another preferred embodiment the polymerizable LC material does not contain polymerizable mesogenic compounds having more than two polymerizable groups.

In another preferred embodiment the polymerizable LC material does not contain polymerizable mesogenic compounds having less than two polymerizable groups.

Preferably one or more organic solvents, preferably all selected solvents are selected from solvents having a boiling point in the range from 60 to 380° C., preferably in the range from 100 to 340° C. and most preferably in the range from 120 to 330° C.

Preferably the one or more organic solvents, preferably all selected solvents are selected from solvents having a melting point preferably below 25° C., which means that the selected solvent is liquid at room temperature.

Preferably the one or more organic solvents, preferably all selected solvents are selected from solvents having a viscosity of >15 mPas, preferably >20 mPas, more preferably >25 mPas and most preferably >50 mPas.

Preferably the one or more organic solvents, preferably all selected solvents are selected from solvents wherein the utilized polymerizable liquid crystalline compounds exhibit solubility in the selected of ≥5 g/l, preferably ≥10 g/l.

Examples of preferred organic solvents and their boiling points (BP) and melting points (MP) are shown in the following Table 1.

TABLE 1

Preferred solvents and their boiling points (BP) and melting points (MP).

| Solvent | BP (° C.) | MP(° C.) |
| --- | --- | --- |
| Cyclohexanone | 155 | Liquid at RT |
| 3-Phenoxytoluene | 271 | Liquid at RT |
| Phenylnapthalene | 324 | Liquid at RT |
| Menthyl isovalerate | 260 | Liquid at RT |
| Di(propylene glycol) methyl ether acetate | 200 | Liquid at RT |
| Propylene glycol monomethyl ether acetate | 145-146 | Liquid at RT |

Preferred organic solvents systems or mixtures are combinations of Cyclohexanone:Di(propylene glycol) methyl ether acetate, Cyclohexanone:Propylene glycol monomethyl ether acetate, or Di(propylene glycol) methyl ether acetate:Propylene glycol monomethyl ether acetate. Preferred mixture rates of the organic solvents systems are in the range from 2:1 to 1:2.

The formulation of the present invention has a viscosity preferably in the range from 0.8 to 50 mPas, more preferably in the range from 1 to 40 mPas, and most preferably in the range from 2 to 15 mPa·s.

The viscosity of the formulations and solvents according to the present invention is measured with a 1° cone-plate rotational rheometer of the type Discovery AR3 (Thermo Scientific). The equipment allows a precise control of the temperature and sheer rate. The measurement of the viscosity is carried out at a temperature of 25.0° C. (+/−0.2° C.) and a sheer rate of 500 s⁻¹. Each sample is measured three times and the obtained measured values are averaged.

The formulation of the present invention has a surface tension preferably in the range from 15 to 70 mN/m, more preferably in the range from 10 to 50 mN/m and most preferably in the range from 20 to 40 mN/m.

Preferably, the organic solvent blend comprises a surface tension in the range from 15 to 70 mN/m, more preferably in the range from 10 to 50 mN/m and most preferably in the range from 20 to 40 mN/m.

The surface tension can be measured using a FTA (First Ten Angstrom) 1000 contact angle goniometer at 20° C. Details of the method are available from First Ten Angstrom as published by Roger P. Woodward, Ph.D. "Surface Tension Measurements Using the Drop Shape Method". Preferably, the pendant drop method can be used to determine the surface tension. This measurement technique dispenses a drop from a needle in a bulk liquid or gaseous phase. The shape of the drop results from the relationship between the surface-tension, gravity and density differences. Using the pendant drop method, the surface tension is calculated from the shadow image of a pendant drop using http://www.kruss.de/services/education-theory/glossary/drop-shape-analysis. A commonly used and commercially available high precision drop shape analysis tool, namely FTA1000 from First Ten Angstrom, was used to perform all surface tension measurements. The surface tension is determined by the software FTA1000. All measurements were performed at room temperature which is in the range between 20° C. and 25° C. The standard operating procedure includes the determination of the surface tension of each formulation using a fresh disposable drop dispensing system (syringe and needle). Each drop is measured over the duration of one minute with sixty measurements which are later on averaged. For each formulation three drops are measured. The final value is averaged over said measurements. The tool is regularly cross-checked against various liquids having well known surface tensions.

For preparation of brightness enhancement films typically cholesteric polymerizable liquid crystalline ink formulations are utilized. Thus, in a preferred embodiment, the polymerizable liquid crystalline ink formulations according to the present invention comprise one or more chiral additives are used in order to induce a cholesteric phase.

Preferred chiral additives can be selected from chiral RMs and chiral dopants, many of which are well known to the skilled person and are commercially available.

Suitable unpolymerizable chiral compounds are for example chiral dopants like R- or S-811, R- or S-1011, R- or S-2011, R- or S-3011, R- or S-4011, R- or S-5011, or CB 15 (all available from Merck KGaA, Darmstadt, Germany).

Suitable polymerizable chiral compounds are for example chiral RMs (R1) to (R10) listed below, or the polymerizable chiral material Paliocolor® LC756 (from BASF AG, Ludwigshafen, Germany).

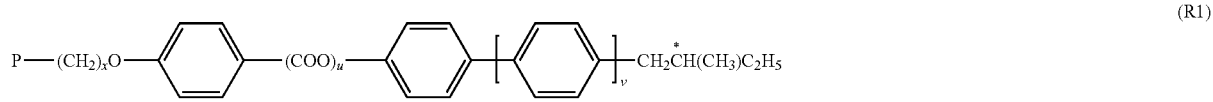
(R1)

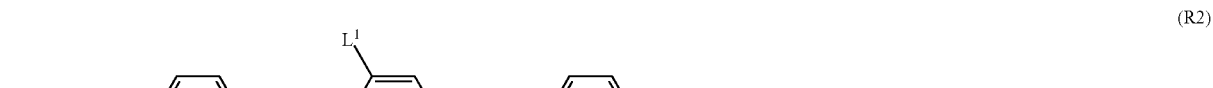
(R2)

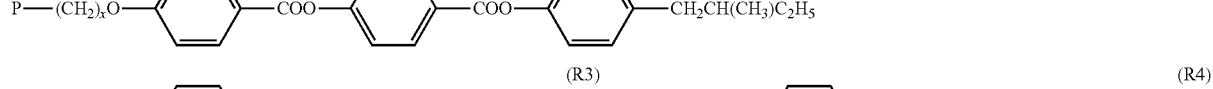
(R3) (R4)

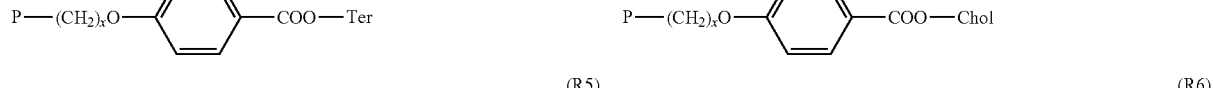
(R5) (R6)

(R7)

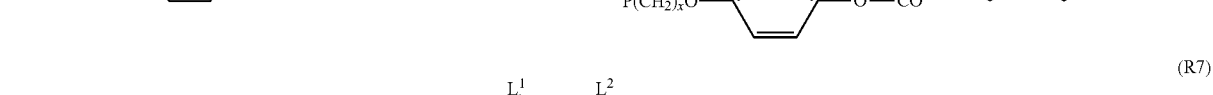
(R8)

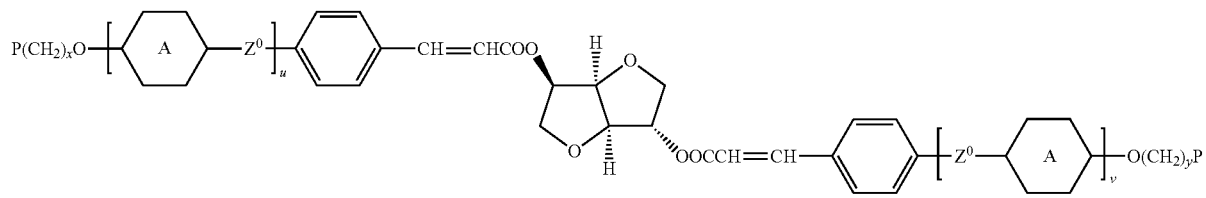

(R9)

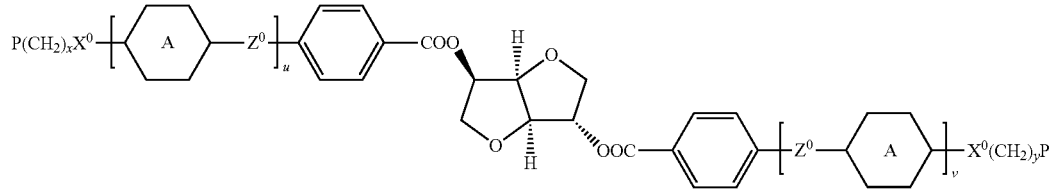

(R10)

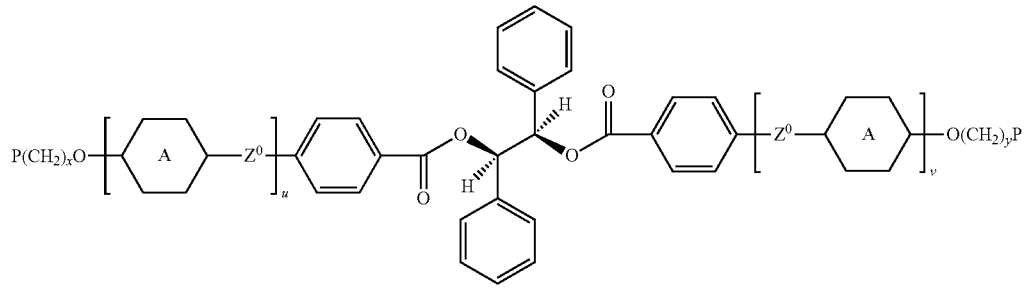

wherein P has one of the meanings given for $P^0$ above, $Z^0$, u, v, x, y, $R^0$ and A are as defined above, and $L^1$ and $L^2$ have independently of each other one of the meanings of L as given above.

Very preferred are chiral compounds with a high HTP, in particular compounds comprising a sorbitol group as described for example in WO 98/00428, compounds comprising a hydrobenzoin group as described for example in GB 2,328,207, chiral binaphthyl derivatives as described for example in WO 02/94805, chiral binaphthol acetal derivatives as described for example in WO 02/34739, chiral TADDOL derivatives as described for example in WO 02/06265, and chiral compounds having at least one fluorinated linkage group and a terminal or central chiral group as described for example in WO 02/06196 or WO 02/06195.

Especially preferred are chiral compounds with a HTP of 40 $\mu m^{-1}$ or higher, very preferably 60 $\mu m^{-1}$ or higher, most preferably 80 $\mu m^{-1}$ or higher.

Especially preferred are polymerizable sorbitols like those of formula (R8) and (R9) and polymerizable hydrobenzoins like those of formula (R10).

Further preferred are non-polymerizable sorbitols and hydrobenzoins of formula M1 and M2 below. Further preferred are chiral binaphthols of formula M3 and M4 below.

M1

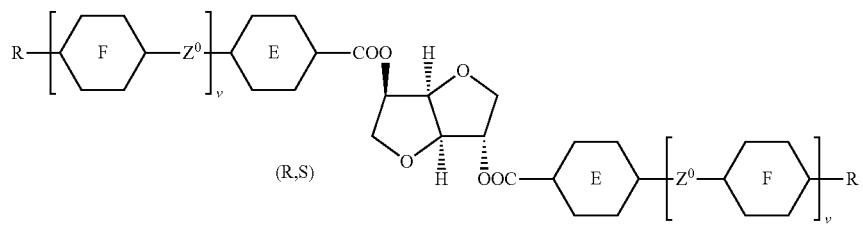

M2

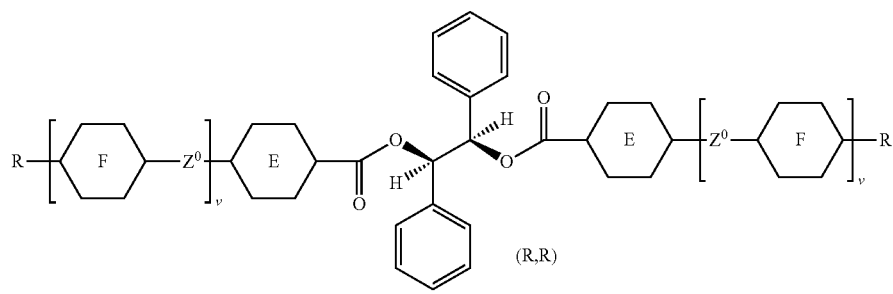

M3

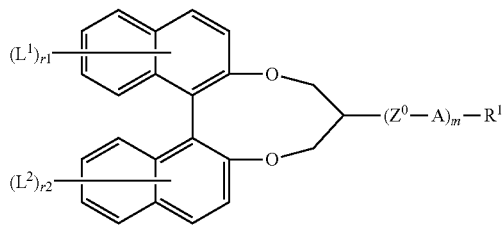

M4

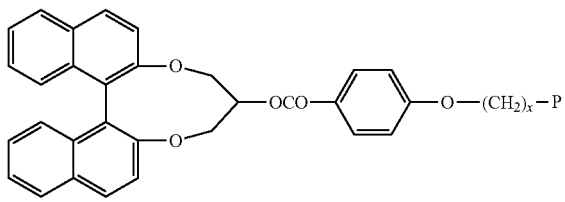

wherein P, $Z^0$, A $L^1$, $L^2$, v and x have the meanings given above, $R^1$ has one of the meanings of $R^0$ given above or is P—Sp, R has one of the meanings of $R^0$, m is 0, 1, 2 or 3 and r1 and r2 are 0, 1, 2, 3 or 4.

Very preferred are compounds of formula M3 wherein $R^1$ is P—Sp. Further preferred are compounds of formula M3 wherein m is 0 or 1, $Z^0$ is —COO—, —OCO— or a single bond, A is 1,4-phenylene optionally substituted by 1 or 2 groups $L^1$ or trans-1,4-cyclohexylene.

The formulation with the chiral additive preferably exhibits a cholesteric LC phase, very preferably a cholesteric LC phase at room temperature.

In a further preferred embodiment the formulation optionally comprises one or more additives selected from the group consisting of further polymerization initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

Lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

These auxiliaries are optionally employed in a proportion of from about 0 to 3.0% by weight, preferably from about 0 to 2.0% % by weight with respect to all solids or components excluding the solvent(s) present.

In another preferred embodiment the formulation comprises one or more specific antioxidant additives, preferably selected from the Irganox® series, e.g. the commercially available antioxidants Irganox®1076 and Irganox®1010, from Ciba, Switzerland.

In another preferred embodiment, the formulation comprises one or more, photoinitiators, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO, further selected from the commercially available OXE02 (Ciba AG), NCI 930, N1919T (Adeka), SPI-03 or SPI-04 (Samyang).

The concentration of the polymerization initiator(s) as a whole in the formulation is preferably from 0.5 to 10%, very preferably from 0.8 to 8%, more preferably 1 to 6% % by weight with respect to all solids or components excluding the solvent(s) present.

Preferably, the ink formulation comprises beside one or more di- or multireactive polymerizable mesogenic compounds and one or more solvents,
- a) one or more monoreactive polymerizable mesogenic compounds,
- b) one or more photoinitiators,
- c) optionally one or more antioxidative additives,
- d) optionally one or more stabilizers,
- e) optionally one or more lubricants and flow auxiliaries.

More preferably, the formulation comprises beside one or more, preferably two or more, directive polymerizable mesogenic compounds, preferably in an amount, if present at all, of 10 to 90%, very preferably 15 to 75% by weight with respect to all components without the solvent(s), preferably selected from the compounds of formula DRMa-1 and one or more solvents,
- a) optionally one or more, preferably two or more, monoreactive polymerizable mesogenic compounds, preferably in an amount of 10 to 95%, very preferably 25 to 85% % by weight with respect to all components without the solvent(s), preferably selected from compounds of formulae MRM-1 and/or MRM-7,
- b) optionally one or more, preferably one photoinitiator, preferably in an amount, if present at all, of 1 to 10%, very preferably 2 to 7% by weight with respect to all components without the solvent(s).

c) optionally one or more antioxidative additives, preferably selected from esters of unsubstituted and substituted benzoic acids, in particular Irganox®1076, and if present, preferably in an amount of 0.01 to 2%, very preferably 0.05 to 1% % by weight with respect to all components without the solvent(s).

d) optionally one or more lubricants and flow auxiliaries, preferably selected from TEGO® Rad 2500, BYK®388, FC 4430 and/or Fluor N 562, and if present, preferably in an amount of 0.1 to 5%, very preferably 0.2 to 3% % by weight with respect to all components without the solvent(s).

Further the present invention relates to a method of production of an ink formulation by mixing at least 10 to 50% w/w with respect to the whole formulation of one or more multi- or directive liquid crystalline compounds with 50 to 90% w/w with respect to the whole formulation of one or more solvents selected from the group of aliphatic ketones, cyclic ketones, alkyl ethers of ethylene glycol or propylene glycol, or aromatic solvents. Further the present invention relates to the use of ink formulations as described above and below in ink jet printers. Suitable Ink jet printers are known to the skilled person, such as Dimatix® Materials Printer series by Fujifilm e.g. DMP-2800 or PIXDRO® LP 50 Meyer Burger.

Further the present invention relates to a method of production of a polymer film comprising the steps of inkjet printing an ink formulation as described above and below on a substrate and curing of the ink formulation.

The area and thickness of the layer provided can vary for the different purposes. Typically, the formulation is provided in a thickness ranging from 500 nm to 2500 nm, preferably from 1000 nm to 2000 nm, more preferably from 1500 nm to 1900 nm.

Typically, the provided area or print dimensions ranges from 1 cm$^2$ to 10 µm$^2$ for the utilization in colour filters as described below preferably the provided area or print dimensions correspond to the subpixel size and typically ranges from 1 mm to 0.01 mm as the smallest length in any pixel shape Preferably a suitable drop spacing is chosen to be in the range from 100 µm to 10 µm, preferably from 50 µm to 15 µm.

Suitable substrate materials or substrates are known to the expert and described in the literature, as for example conventional substrates used in the optical films industry, such as glass or plastic. Especially suitable and preferred substrates for polymerization are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known colour filter materials, in particular triacetylcellulose (TAC), cyclo olefin polymers (COP), or commonly known colour filter materials.

In a preferred embodiment, the process according to the invention contains a process step where the ink formulation can rest for a period of time in order to evenly redistribute the ink on the substrate (herein referred to as "annealing").

Preferably, after printing the ink is annealed for a time between 1 min and 3 h, preferably between 2 min and 1 h and most preferably between 5 min and 30 min. The annealing is preferably performed at room temperature.

In an alternative embodiment, the annealing is performed at elevated temperature, preferably at above 20° C. and below 140° C., more preferably above 40° C. and below 100° C. and most preferably above 50° C. and below 90° C.

The polymerizable LC material (RM or reactive mesogens) of the ink formulation preferably exhibits a uniform alignment throughout the whole layer after being cured or inkjet printed on the substrate. Preferably the polymerizable LC material exhibits a uniform planar or a uniform homeotropic alignment.

The Friedel-Creagh-Kmetz rule can be used to predict whether a mixture will adopt planar or homeotropic alignment, by comparing the surface energies of the RM layer and the substrate:

If $\gamma_{RM} > \gamma_s$ the reactive mesogenic compounds will display homeotropic alignment, If $\gamma_{RM} < \gamma_s$ the reactive mesogenic compounds will display homogeneous alignment.

When the surface energy of a substrate is relatively low, the intermolecular forces between the reactive mesogens are stronger than the forces across the RM-substrate interface. Therefore, reactive mesogens align perpendicular to the substrate (homeotropic alignment) in order to maximise the intermolecular forces.

Homeotropic alignment can also be achieved by using amphiphilic materials; they can be added directly to the polymerizable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are described above.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

When the surface tension of the substrate is greater than the surface tension of the RMs, the force across the interface dominates. The interface energy is minimised if the reactive mesogens align parallel with the substrate, so the long axis of the RM can interact with the substrate. One way planar alignment can be promoted is by coating the substrate with a polyimide layer, and then rubbing the alignment layer with a velvet cloth.

Other suitable planar alignment layers are known in the art, like for example rubbed polyimide or alignment layers prepared by photoalignment as described in U.S. Pat. Nos. 5,602,661, 5,389,698 or U.S. Pat. No. 6,717,644.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals-Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

To produce the polymer films according to the invention, the polymerizable compounds in the formulation are cured, polymerized or crosslinked (if one compound contains two or more polymerizable groups).

In a preferred method of preparation, the formulation is printed onto a substrate and subsequently photopolymerized for example by exposure to actinic radiation as described for example in WO 01/20394, GB 2,315,072 or WO 98/04651.

Photopolymerization of the formulation is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerization is carried out by photo irradiation, in particular with UV light. As a source for actinic radiation, for example a single UV lamp or a set of UV lamps can be used. When using a high lamp power, the curing time can be reduced. Another possible source for photo radiation is a laser, like e.g. a UV laser, an IR laser, or a visible laser.

The curing time is dependent, inter alia, on the reactivity of the polymerizable LC compounds, the thickness of the printed layer, the type of polymerization initiator and the power of the UV lamp.

Typically, the curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm−2, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Photopolymerization is preferably performed under an inert gas atmosphere, preferably in a heated nitrogen atmosphere, but also polymerization in air is possible.

Photopolymerization is preferably performed at a temperature from 1 to 70° C., more preferably 5 to 50° C., even more preferably 15 to 30° C.

The polymerized LC film according to the present invention has good adhesion to plastic substrates, in particular to TAC, COP, and colour filters. Accordingly, it can be used as adhesive or base coating for subsequent LC layers which otherwise would not well adhere to the substrates.

For example, uniformly homeotropic or planar aligned polymer films of the present invention can be used as retardation or compensation or reflective films for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

Therefore, the invention also relates to the use of a polymer film as described above and below as an optical film or in an optical component.

The optical retardation ($\delta(\lambda)$) of a polymer film as a function of the wavelength of the incident beam ($\lambda$) is given by the following equation:

$$\delta(\lambda)=(2\pi\Delta n \cdot d)/\lambda$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n = \sin \Theta / \sin \Psi$$

wherein sin $\Theta$ is the incidence angle or the tilt angle of the optical axis in the film and sin is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the thickness of the ink formulation or the polymer film.

The birefringence ($\Delta n$) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film according to the present invention is less than 200 nm, preferable less than 180 nm and even more preferable less than 160 nm.

The polymer film of the present invention can also be used as alignment film for other liquid-crystalline or RM materials. For example, they can be used in an LCD to induce or improve alignment of the switchable liquid-crystalline medium, or to align a subsequent layer of polymerizable LC material coated thereon. In this way, stacks of polymerized LC films can be prepared.

In summary, the polymer films according to the present invention are useful in optical components like polarisers, compensators, alignment layer, circular polarisers or colour filters in liquid crystal displays or projection systems, and especially in reflective films with spatially varying reflection colours.

Therefore, the present invention also relates to an optical component, comprising one or more polymer films obtainable or obtained from an ink formulation as described above and below.

In another preferred embodiment, the optical component comprises one or more, preferably two or more polymer films obtainable or obtained from an ink formulation as described above and below that are selected from A plates C plates, Biaxial polymer films, or cholesteric polymer films or even any combinations thereof.

Preferably, the present invention relates to a colour filter comprising one or more, preferably two or more polymer films obtainable or obtained from an ink formulation as described above and below.

Preferably the colour filter comprises multiple coloured pixel patterns having a certain retardation, a polymer film on the multiple coloured pixel patterns obtainable from an ink formulation provided by ink jet printing corresponding to each retardation of the said multiple coloured pixel patterns, wherein the said liquid crystal phase shift layer comprises the multiple liquid crystal phase shift regions corresponding to the multiple the retardation which corrects the retardation of the said multiple coloured pixel patterns; and the total for the retardation of the said multiple coloured pixel patterns and the retardation in the corresponding multiple polymer film shift regions is characteristically and essentially same for each pixel.

For this purpose, it is preferred that the colour filter comprises one or more, preferably two or more polymer films obtainable or obtained from an ink formulation as described above and below with different birefringence for every subpixel of the colour filter such as red, green and blue.

More preferably, the present invention relates to a quantum material-based colour filter comprising one or more, preferably two or more polymer films obtainable or obtained from an ink formulation as described above and below.

For this purpose, it is preferred that the colour filter comprises one or more, preferably two or more cholesteric polymer films obtainable or obtained from an ink formulation as described above and below with different reflectance characteristics for every subpixel of the colour filter such as red, green and blue. For example, Red/Green/Blue CLC reflectors with both left and right handed helix orientation for each subpixel of the colour filter.

The polymer films according to the present invention can be used in displays of the transmissive or reflective type. They can be used in conventional or QD-type OLED and LCD displays containing pixel-colour-converter modules (PCCs) in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (x-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

Thus, another aspect of the present invention is the use of one or more polymer films or optical components as described above and below in an optical device, or an optical device comprising one or more optical components that comprise one or more polymer films obtainable or obtained from one or more ink formulation as described above and below.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention.

Independent protection may be sought for these features in addition to or alternative to any invention presently claimed.

The invention will now be described in more detail by reference to the following working examples, which are illustrative only and do not limit the scope of the invention.

Working Examples

Utilized Reactive Mesogenic Mixtures (RMM):

The following reactive mesogenic mixtures are prepared in accordance with the following tables:

| | RMM 1: | |
|---|---|---|
| Compound | | Amount % w/w |
| Irganox ® 1076 | | 0.08 |
| FluorN ® 562 | | 0.58 |
| Irgacure ® 907 | | 5.05 |
| 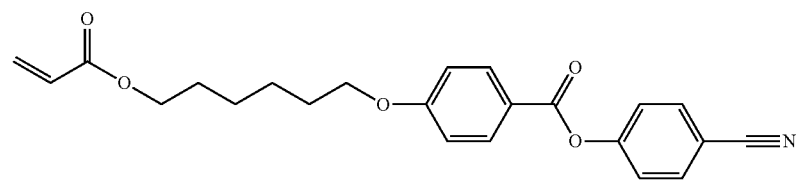 [SMILES: C=CC(=O)OCCCCCCOc1ccc(C(=O)Oc2ccc(C#N)cc2)cc1] | | 23.59 |
| 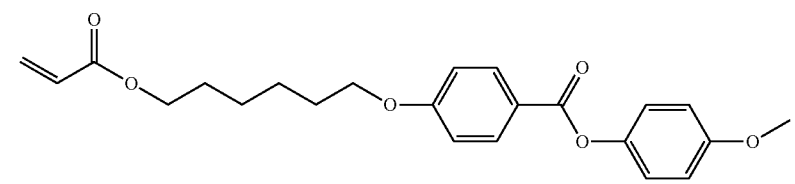 [SMILES: C=CC(=O)OCCCCCCOc1ccc(C(=O)Oc2ccc(OC)cc2)cc1] | | 23.59 |

-continued
| RMM 1: | |
|---|---|
| Compound | Amount % w/w |
| 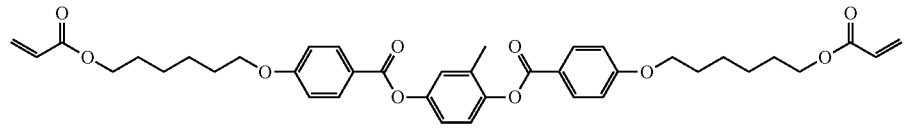 [SMILES: C=CC(=O)OCCCCCCOc1ccc(C(=O)Oc2ccc(OC(=O)c3ccc(OCCCCCCOC(=O)C=C)cc3)c(C)c2)cc1] | 9.32 |
| 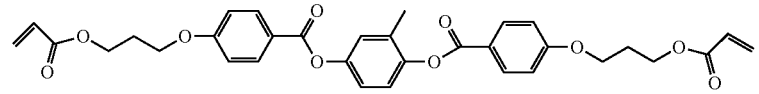 | 37.79 |
| RMM 2: | |
|---|---|
| Compound | Amount % w/w |
| Irganox ® 1076 | 0.08 |
| Tego Rad ® 2500 | 0.05 |
| Irgacure ® 907 | 5.00 |
|  | 3.65 |
|  | 15.00 |
| 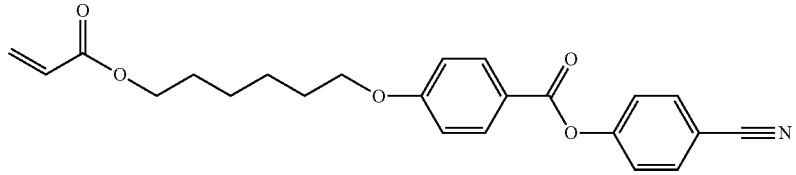 [SMILES: C=CC(=O)OCCCCCCOc1ccc(C(=O)Oc2ccc(C#N)cc2)cc1] | |
|  | 15.00 |
|  | 8.14 |
| 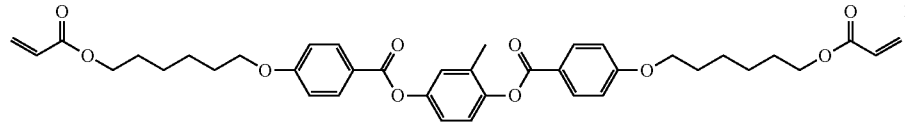 [SMILES: C=CC(=O)OCCCCCCOc1ccc(C(=O)Oc2ccc(OC(=O)c3ccc(OCCCCCCOC(=O)C=C)cc3)c(C)c2)cc1] | |
|  | 20.00 |
|  | 33.08 |
| 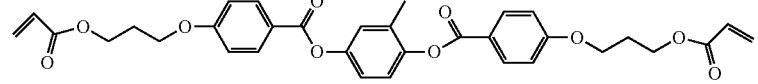 | |
| RMM 3: | |
|---|---|
| Compound | Amount % w/w |
| Irganox® 1076 | 0.08 |
| Tego Rad® 2500 | 0.05 |
| Irgacure® 907 | 5.00 |
|  | 3.05 |
|  | 15.00 |
| 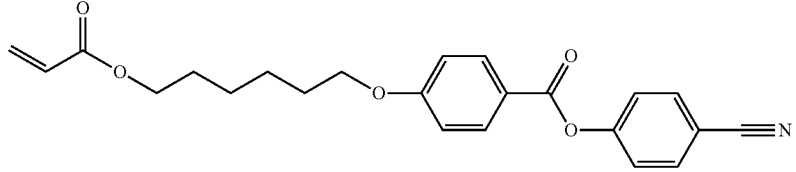 [SMILES: C=CC(=O)OCCCCCCOc1ccc(C(=O)Oc2ccc(C#N)cc2)cc1] | |

RMM 3:

| Compound | Amount % w/w |
|---|---|
| [Chemical structure: diacrylate with hexyl spacers, two benzoate groups, methylphenylene center] | 15.00 / 8.45 |
| [Chemical structure: diacrylate with propyl/shorter spacers, two benzoate groups, methylphenylene center] | 20.00 / 33.37 |

Utilized Solvents and Solvent Systems

| System No. | Solvent | Ratio |
|---|---|---|
| 1 | Cyclohexanone | - |
| 2 | 3-Phenoxytoluene | - |
| 3 | Phenylnapthalene | - |
| 4 | Menthyl isovalerate | - |
| 5 | Di(propylene glycol) methyl ether acetate (DiPGMEA) | - |
| 6 | Propylene glycol monomethyl ether acetate (PGMEA) | - |
| 7 | Cyclohexanone:DiPGMEA | 2:1 |
| 8 | PGMEA:DiPGMEA | 7:10 |

Utilized Ink Jet Printer:

| 1 | Dimatix ® Materials Printer 2800 by Fujifilm |
| 2 | PIXDRO ® LP 50 by Meyer Burger. |

General Procedure:

Ink formulations are prepared by mixing corresponding RMMs with corresponding solvent systems (SS). The inks were then printed in the given print dimensions (PD), with the given drop spacing (DS). The layer was then annealed at 90° C. for 60 seconds and cooled to room temperature. The layer was then cured with 250-450 nm Omnicure lamp at 50 mW for 120 seconds in air. The birefringence ($\Delta n$) and in case of cholesteric polymer films the central reflection wavelength ($\lambda$) and reflection bandwidth ($d\lambda$) is determined after curing.

Working Examples

Non-Cholesteric Polymer Films:

| No. | RMM | SS | Amount Solids [%] | PD | Printer | DS [µm] | $\Delta n$ |
|---|---|---|---|---|---|---|---|
| 1 | 1 | 8 | 30 | 1 cm × 1 cm | 1 | 36 | 0.151 |
| 2 | 1 | 7 | 40 | 500 µm × 500 µm | 1 | 35 | 0.152 |
| 3 | 1 | 7 | 40 | 500 µm × 500 µm | 1 | 40 | 0.150 |
| 4 | 1 | 7 | 40 | 500 µm × 500 µm | 1 | 45 | 0.153 |
| 5 | 1 | 7 | 40 | 500 µm × 500 µm | 1 | 50 | 0.150 |
| 6 | 1 | 7 | 40 | 200 µm × 200 µm | 1 | 45 | 0.152 |
| 7 | 1 | 7 | 40 | 200 µm × 200 µm | 1 | 50 | 0.153 |
| 8 | 1 | 7 | 40 | 200 µm × 200 µm | 1 | 55 | 0.153 |
| 9 | 1 | 7 | 40 | 200 µm × 200 µm | 1 | 60 | 0.151 |
| 10 | 1 | 7 | 40 | 200 µm × 200 µm | 1 | 80 | 0.151 |
| 11 | 1 | 7 | 40 | 200 µm × 200 µm | 1 | 85 | 0.151 |
| 12 | 1 | 7 | 40 | 2.5 cm × 2.5 cm | 1 | 60 | 0.152 |
| 13 | 1 | 7 | 40 | 2.5 cm × 2.5 cm | 1 | 60 | 0.151 |
| 14 | 1 | 7 | 40 | 2.5 cm × 2.5 cm | 1 | 60 | 0.150 |
| 15 | 1 | 7 | 40 | 100 µm × 300 µm | 1 | 30 | 0.153 |
| 16 | 1 | 7 | 40 | 100 µm × 300 µm | 1 | 34 | 0.150 |

Cholesteric Polymer Films:

| No. | RMM | SS | Amount Solids [%] | PD | Printer | DS [µm] | $\lambda$ | $d\lambda$ |
|---|---|---|---|---|---|---|---|---|
| 17 | 2 | 8 | 40 | 4 mm × 4 mm | 1 | 15 | 532 | 83 |
| 18 | 2 | 8 | 40 | 4 mm × 4 mm | 1 | 20 | 530 | 74 |
| 19 | 2 | 8 | 40 | 4 mm × 4 mm | 1 | 25 | 522 | 57 |
| 21 | 2 | 8 | 15 | 8 mm × 8 mm | 2 | 16 | 533 | 53 |
| 22 | 3 | 8 | 15 | 4 mm × 4 mm | 2 | 16 | 634 | 65 |

The invention claimed is:
1. An ink formulation comprising:
   10 to 50% w/w of one or more polymerizable liquid crystalline compounds and 50 to 90% w/w of organic solvent,
   wherein the organic solvent is (a) a mixture of cyclohexanone and di(propylene glycol) methyl ether acetate at a ratio of 2:1 to 1:2, or (b) a mixture of di(propylene glycol) methyl ether acetate and propylene glycol monomethyl ether acetate at a ratio of 2:1 to 1:2,
   wherein said one or more polymerizable liquid crystalline compounds are selected from formulae DRMa1, MRM1, and MRM7,

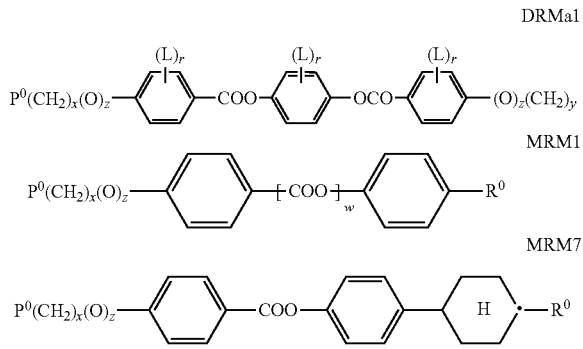

wherein
- P⁰ is, in case of multiple occurrence independently of one another, a polymerizable group, preferably an acryl, methacryl, oxetane, epoxy, vinyl, heptadiene, vinyloxy, propenyl ether or styrene group,
- L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
- r is 0, 1, 2, 3 or 4,
- x and y are independently of each other 0 or identical or different integers from 1 to 12,
- z is each and independently, 0 or 1, with z being 0 if the adjacent x or y is 0,
- R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes Y⁰,
- w is 1,
- and wherein, in formulae MRM1 and MRM7, the benzene and naphthalene rings can additionally be substituted with one or more identical or different groups L, and wherein said ink formulations is suitable for inkjet printing.

2. The ink formulation according to claim 1, further comprising one or more chiral additives.

3. The ink formulation according to claim 1, further comprising one or more photoinitiators.

4. A polymer film obtained from inkjet printing an ink formulation according to claim 1 on a substrate and curing of the ink formulation.

5. An optical component, comprising one or more polymer films according to claim 4.

6. The optical component according to claim 5, wherein the one or more polymer films are selected from A plates, C plates, biaxial polymer films, cholesteric polymer films, and any combination thereof.

7. The optical component according to claim 5, wherein the optical component is a color filter comprising the one or more polymer films.

8. The optical component according to claim 5, wherein the optical component is a quantum material-based color filter comprising one or more polymer films.

9. The ink formulation according to claim 1, wherein the organic solvent is a mixture of cyclohexanone and di(propylene glycol) methyl ether acetate at a ratio of 2:1 to 1:2.

10. The ink formulation according to claim 1, wherein the organic solvent is a mixture of di(propylene glycol) methyl ether acetate and propylene glycol monomethyl ether acetate at a ratio of 2:1 to 1:2.

11. A method of production of an ink formulation according to claim 1 comprising: mixing at least 10 to 50% w/w of one or more the polymerizable liquid crystalline compounds with 50 to 90% w/w of the organic solvent.

12. A method of printing comprising printing with an ink jet printer using an ink formulation according to claim 1.

13. A method of production of a polymer film comprising inkjet printing an ink formulation according to claim 1, on a substrate and curing of the ink formulation.

* * * * *